(12) United States Patent
Huang et al.

(10) Patent No.: US 8,242,924 B2
(45) Date of Patent: Aug. 14, 2012

(54) LAPTOP COMPUTER WITH HARDWARE SECURITY PROTECTION

(75) Inventors: Chih-Min Huang, Taipei (TW); Yi-Ting Chen, Taipei (TW); Li-Yen Wang, Taipei (TW)

(73) Assignee: Asustek Computer Inc., Taipei (TW)

( * ) Notice: Subject to any disclaimer, the term of this patent is extended or adjusted under 35 U.S.C. 154(b) by 366 days.

(21) Appl. No.: 12/560,467

(22) Filed: Sep. 16, 2009

(65) Prior Publication Data

US 2010/0102979 A1 Apr. 29, 2010

(30) Foreign Application Priority Data

Oct. 23, 2008 (TW) ................................ 97140583 A

(51) Int. Cl.
*G08B 21/00* (2006.01)

(52) U.S. Cl. .................. 340/686.1; 340/549; 340/545.6; 340/545.7; 348/207.1; 348/373; 361/679.55

(58) Field of Classification Search ............... 340/686.1, 340/549, 545.6, 545.7; 348/207.1, 373; 361/679.55, 361/679.57, 683, 686
See application file for complete search history.

(56) References Cited

U.S. PATENT DOCUMENTS

| 6,760,074 | B1 * | 7/2004 | Maruyama et al. | ........... 348/375 |
| 7,581,893 | B2 * | 9/2009 | Miramontes | .................... 396/448 |
| 2001/0014006 | A1 * | 8/2001 | Kim et al. | ..................... 361/683 |
| 2011/0058255 | A1 * | 3/2011 | Weiss | ............................. 359/511 |

* cited by examiner

*Primary Examiner* — Tai T Nguyen
(74) *Attorney, Agent, or Firm* — Muncy, Geissler, Olds & Lowe, PLLC

(57) ABSTRACT

A laptop computer with hardware security protection includes a lid near the image capture module. The lid can move to shield the image capture module to avoid the image captured by the image capture module transmitting to another computer. Therefore, the hardware security protection is achieved by the real lid to prevent the hacker attacking and increase the security protection.

10 Claims, 4 Drawing Sheets

LAPTOP COMPUTER WITH HARDWARE SECURITY PROTECTION

BACKGROUND OF THE INVENTION

1. Field of Invention

The invention relates to a laptop computer with hardware security protection and, more particularly, to a laptop computer with hardware security protection by a real lid on the laptop computer to shield the image capture module.

2. Related Art

A conventional laptop computer is usually provided with a webcam. Generally speaking, the webcam is provided on the panel of the laptop computer. A user can operate the webcam to face him or her to capture images. It facilitates the user taking a video call and the other side can see the images via network transmission.

However, there is not any protection to a webcam of the conventional laptop computer. Moreover, the switch of the webcam is controlled by software, and users cannot determine whether the switch is on or off according to the appearance. Therefore, personal or private images may be transmitted to another computer if the user neglects to switch off the webcam. It is a threat to privacy protection.

Moreover, spyware such as Trojan Programs and Internet hacker are very popular in recent years. Since the switch of a webcam is still controlled by software, the invader can get control of the webcam if the webcam is attacked by a hacker or hidden spyware. Besides the threat to the personal or private images, trade secrets may be stolen unconsciously if the commercial laptop computer is attached during a video conference.

On the other hand, webcams of some laptop computers are designed to be rotatable module to facilitate capturing images. The webcams can rotate 180 degrees and the lens captures images forward. Due to the design of the mechanism, the webcams can only rotate back and forth in reciprocating mode within 180 degrees. Even the lens can rotate forth, up and down to prevent images of the user's self revealing, images of the usage environment such as a conference room, an office or a house may be revealed. Furthermore, users are not used to turning away lens, so it is still not sufficient enough for security protection.

SUMMARY OF THE INVENTION

A laptop computer with hardware security protection includes a host, a display, an image capture module and a lid according to the invention. The display is pivotally connected to the host and it can display information of the host. The image capture module is disposed on the display to capture images, and the images are displayed on the display. The lid is disposed at the display and near the image capture module, and it can slide between a closed position where the lid shields the image capture module and an open position where the lid exposes the image capture module. Security protection is achieved by the real lid shielding the image capture module. It can be determined that whether the image capture module is shielded or not according to the appearance. Therefore, image revealing because of users' neglect can be prevented.

Moreover, the invention further includes a trigger switch which is disposed on the display and near the lid. The trigger switch is triggered, and the display displays a prompt message to prompt the lid is open when the lid slides to an open position. Then, the image capture module can capture images. Therefore, security protection can be further achieved.

These and other features, aspects, and advantages of the invention will become better understood with regard to the following description, appended claims, and accompanying drawings.

DETAILED DESCRIPTION OF THE INVENTION

Figure 1:
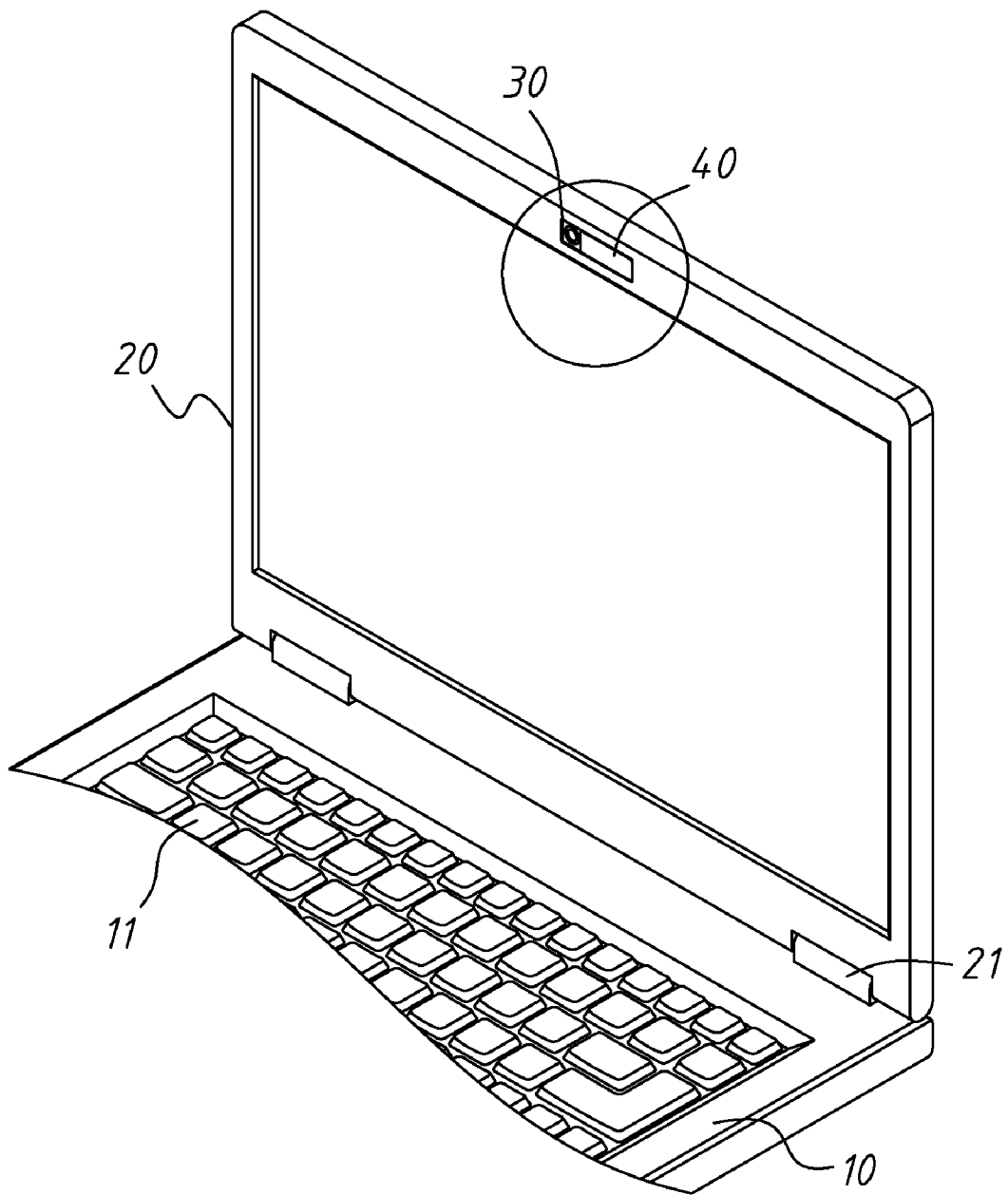
FIG. 1 is a schematic diagram of a laptop computer with hardware security protection according to the invention.

As shown in FIG. 1, it is a schematic diagram of a laptop computer with hardware security protection according to the invention.

The laptop computer with hardware security protection according to the invention includes a host 10, a display 20, an image capture module 30 and a lid 40. The host 10 includes electronic elements such as a motherboard, a central processing unit (CPU), a control chipset and a hard disk therein and can perform operations of electronic data, audiovisual data and so on. An external keyboard 11 is provided for users to input information or instructions. The display 20 is pivotally connected to the host 10 by a pivot 21 provided at the base of the display 20, thereby the display 20 may rotate relative to the host 10 to be open or closed. As shown in FIG. 1, the display 20 is open.

The image capture module 30 is provided on the display 20. As shown in FIG. 1, the image capture module 30 is provided at the top of the display 20 which is the most common position. The image capture module 30 may be certainly provided at other positions of the display 20 but not limited to be at the top of the display 20. The user can operate the image capture module 30 to capture images. Generally speaking, the image capture module 30 is controlled by software without hardware.

The lid 40 is disposed on the display 20 and near the image capture module 30. The lid may slide between a closed position where the lid 40 shields the image capture module 30 and an open position where the lid 40 exposes the image capture module 30. More detailed description is shown as follows according to the following embodiments.

Figure 2A:
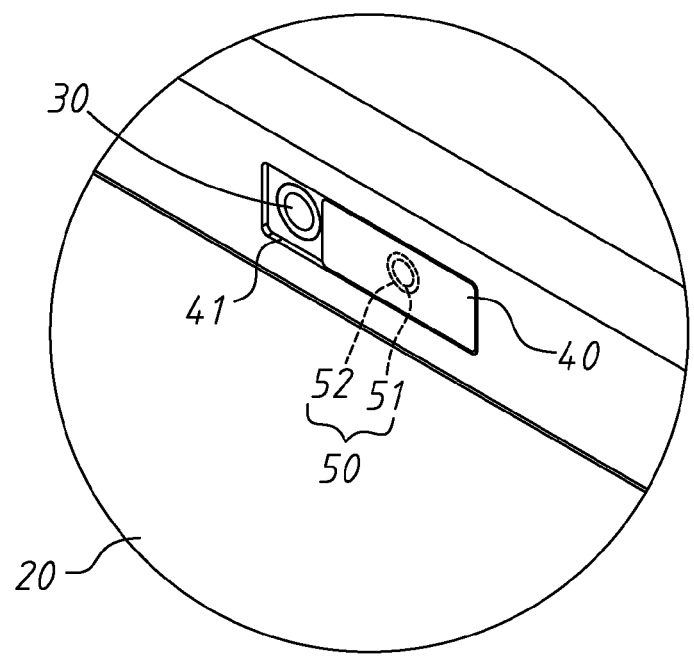
FIG. 2A and FIG. 2B are schematic diagrams showing a lid of a laptop computer with hardware security protection according to the first embodiment of the invention.
Figure 2B:
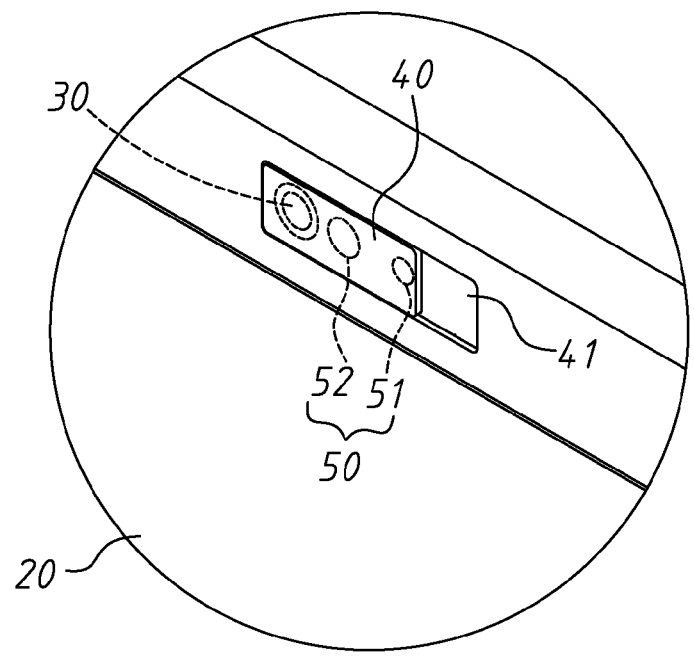

As shown in FIG. 2A and FIG. 2B, they are schematic diagrams showing a lid of a laptop computer with hardware security protection according to the first embodiment of the invention.

The lid 40 is approximately rectangular and provided in a slideway 41. The lid 40 may horizontally slide in the slideway 41 between the far right side and the far left side. The far right side is an open position (as shown in FIG. 2A) where the lid 40 exposes the image capture module 30 and the far left side is a closed position (as shown in FIG. 2B) where the lid 40 shields the image capture module 30.

Figure 3A:
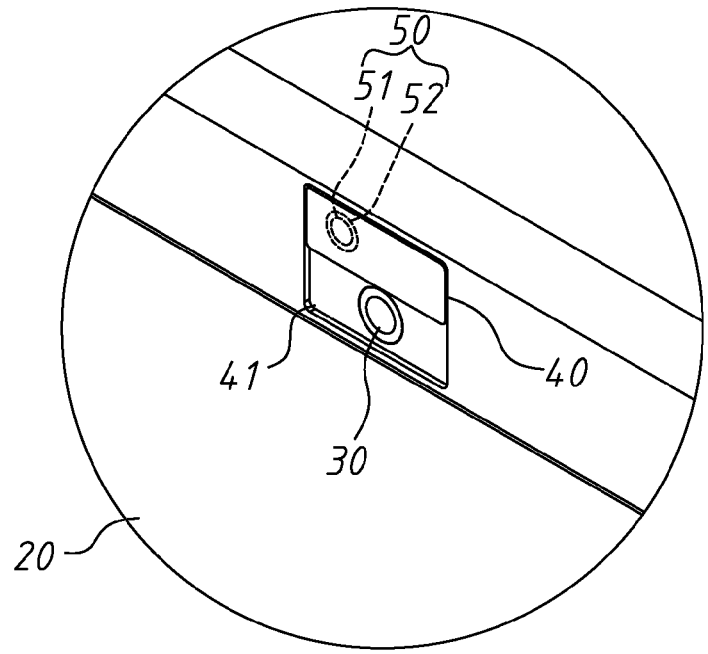
FIG. 3A and FIG. 3B are schematic diagrams showing a lid of a laptop computer with hardware security protection according to the second embodiment of the invention.
Figure 3B:
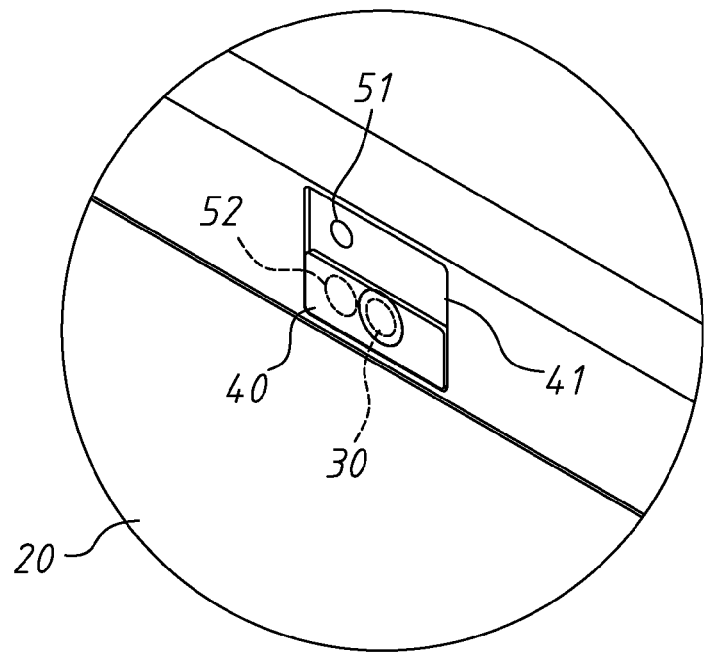

As shown in FIG. 3A and FIG. 3B, they are schematic diagrams showing a lid of a laptop computer with hardware security protection according to the second embodiment of the invention.

The lid 40 is also design to be rectangular. The lid 40 may vertically slide in the slideway 41 between the upper most side and the lower most side. The upper most side is an open position (as shown in FIG. 3A) where the lid 40 exposes the image capture module 30 and the lower most side is a closed position (as shown in FIG. 3B) where the lid 40 shields the image capture module 30.

Figure 4A:
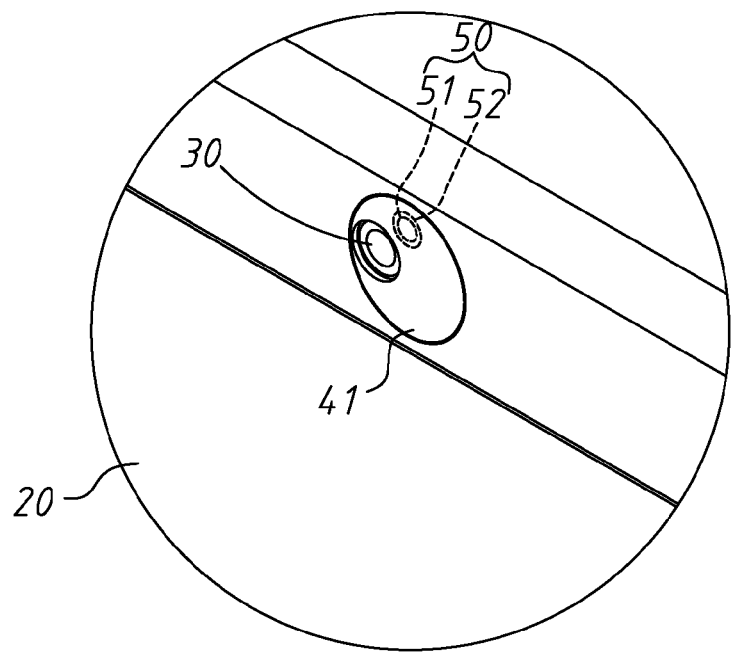
FIG. 4A and FIG. 4B are schematic diagrams showing a lid of a laptop computer with hardware security protection according to the third embodiment of the invention.
Figure 4B:
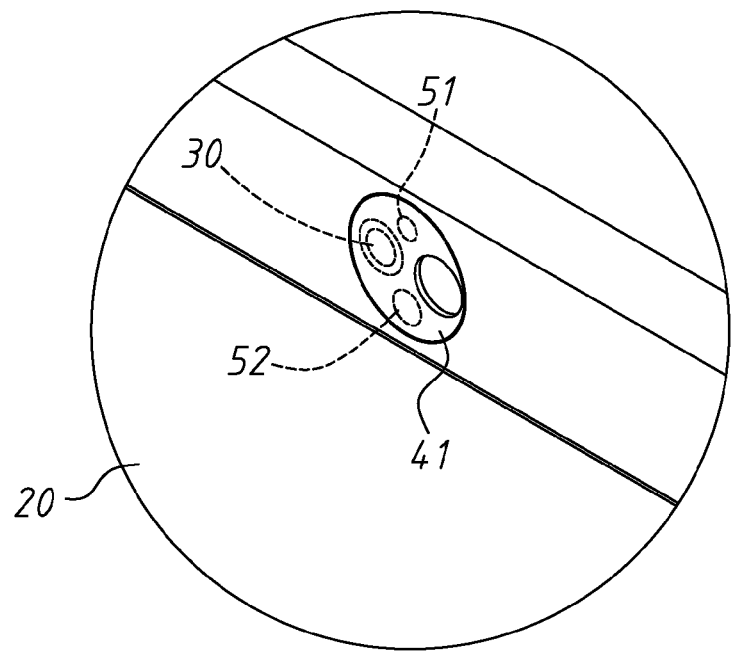

As shown in FIG. 4A and FIG. 4B, they are schematic diagrams showing a lid of a laptop computer with hardware security protection according to the third embodiment of the invention.

The shape of the lid 40 may be circular. The lid 40 may rotate between an open position (as shown in FIG. 4A) where the lid 40 exposes the image capture module 30 and a closed position (as shown in FIG. 4B) the lid 40 shields the image capture module 30. The shape of the lid 40 is not limited to the shapes disclosed in the embodiments as long as the lid 40 can move to the open position and the closed position.

As a result, usually, when the lid 40 is at the open position, the image capture module 30 can be normally used. It is provided for a user to operate to capture images, and the images are displayed on the display 20. The lid 40 can be moved to the closed position where the lid 40 shields the image capture module 30. The user can determine whether the image capture module 30 is shielded or not just by the appearance. Even if the image capture module 30 is not switched off or attached by a hacker or hidden spyware etc., the image capture module 30 can only capture the image of the lid 40. Due to the shield of the real lid 40, there is no threat to reveal private images, security protection is increased.

On the other hand, to further ensure the security, the user may be prompted when the image capture module 30 is at the open position. As a result, a trigger switch 50 is provided near the lid 40. As shown in FIG. 2A~FIG. 4B, the trigger switch 50 includes a first conductor 51 and a second conductor 52, which are disposed on the display 20 and the lid 40 respectively. When the lid 40 slides to the open position, the first conductor 51 and the second conductor 52 will electrically conduct with each other so as to trigger the trigger switch 50. Meanwhile, the display 20 displays a prompt message to prompt the user that the lid 40 is open and the image capture module 30 may capture images. The user may close the lid 40 immediately if he or she does not want the lid 40 to be open. The prompt message may be realized in the most common manner of the operation system such as a pop up window, a marquee message or an audio message etc.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A laptop computer, comprising:
   a host;
   a display pivotally connected with the host;
   an image capture module disposed on the display;
   a lid disposed at the display and near the image capture module, the lid moving between a closed position where the lid shields the image capture module and an open position where the lid exposes the image capture module; and
   a trigger switch disposed at the display and including a first conductor and a second conductor, which are disposed on the display and the lid respectively when the lid slides to the open position, the first and second conductors electrically conduct with each other such that the trigger switch is triggered, and the display displays a prompt message to prompt that the lid is at the open position.

2. The laptop computer of claim 1, wherein the lid is disposed at the display via a slideway.

3. The laptop computer of claim 2, wherein the lid horizontally slides in the slideway between the closed position and the open position.

4. The laptop computer of claim 2, wherein the lid vertically slides in the slideway between the closed position and the open position.

5. The laptop computer of claim 1, wherein the lid rotatably moves in the slideway between the closed position and the open position.

6. The laptop computer of claim 5, wherein the lid is circular.

7. The laptop computer of claim 1, wherein the image capture module is disposed at the top of the display.

8. The laptop computer of claim 1, wherein the prompt message is a pop up window.

9. The laptop computer of claim 1, wherein the prompt message is a marquee message.

10. The laptop computer of claim 1, wherein the prompt message is an audio message.

* * * * *